US011888972B2

(12) United States Patent
Tsirkin

(10) Patent No.: US 11,888,972 B2
(45) Date of Patent: Jan. 30, 2024

(54) SPLIT SECURITY FOR TRUSTED EXECUTION ENVIRONMENTS

(71) Applicant: Red Hat, Inc., Raleigh, NC (US)

(72) Inventor: Michael Tsirkin, Westford, MA (US)

(73) Assignee: RED HAT, INC., Raleigh, NC (US)

( * ) Notice: Subject to any disclaimer, the term of this patent is extended or adjusted under 35 U.S.C. 154(b) by 121 days.

(21) Appl. No.: 16/802,066

(22) Filed: Feb. 26, 2020

(65) Prior Publication Data

US 2021/0266148 A1 Aug. 26, 2021

(51) Int. Cl.
*H04L 9/08* (2006.01)
*G06F 9/455* (2018.01)

(52) U.S. Cl.
CPC .......... *H04L 9/083* (2013.01); *G06F 9/45558* (2013.01); *H04L 9/085* (2013.01); *H04L 9/0894* (2013.01); *G06F 2009/45562* (2013.01)

(58) Field of Classification Search
CPC ....... H04L 9/083; H04L 9/085; H04L 9/0894; G06F 9/45558
USPC ......................................................... 713/155
See application file for complete search history.

(56) References Cited

U.S. PATENT DOCUMENTS

| 8,954,965 | B2 | 2/2015 | Novak et al. | |
| 9,124,563 | B2 | 9/2015 | Castillo et al. | |
| 9,425,965 | B2 | 8/2016 | Baumann et al. | |
| 9,479,328 | B1 * | 10/2016 | Wilburn | H04L 9/0861 |
| 9,607,298 | B2 | 3/2017 | Brudnicki et al. | |
| 2013/0347064 | A1 * | 12/2013 | Aissi | G06F 21/53 726/2 |
| 2014/0007087 | A1 | 1/2014 | Scott-Nash et al. | |
| 2018/0212940 | A1 | 7/2018 | Novak | |
| 2018/0330092 | A1 * | 11/2018 | Sniezek | G06F 21/57 |
| 2019/0042759 | A1 | 2/2019 | Smith et al. | |
| 2019/0102555 | A1 | 4/2019 | Novak et al. | |
| 2019/0140846 | A1 * | 5/2019 | Moore | H04L 9/14 |
| 2019/0155728 | A1 | 5/2019 | Ferguson et al. | |
| 2019/0243950 | A1 | 8/2019 | Soriente et al. | |
| 2020/0167503 | A1 * | 5/2020 | Wei | G06F 21/602 |

FOREIGN PATENT DOCUMENTS

WO    WO 2019089403 A1    5/2019

OTHER PUBLICATIONS

Robert Buhren, Christian Werling, Jean-Pierre Seifert; "Insecure Until Proven Updated: Analyzing AMD SEV's Remote Attestation"; Technische Universitt Berlin, Security in Telecommunications; Hasso Plattner Institute, Potsdam; Technische Universitt Berlin, Security in Telecommunications | Sep. 2, 2019 | pp. 1-13.

(Continued)

*Primary Examiner* — Kambiz Zand
*Assistant Examiner* — Phuc Pham
(74) *Attorney, Agent, or Firm* — K&L Gates LLP

(57) ABSTRACT

A system includes a memory, an application TEE instance, an escrow TEE instance, and a server. The server is configured to receive a request to start the application TEE instance and launch the escrow TEE instance provisioned with a secret. The secret is initially accessible from a first location until the escrow TEE instance is provisioned and accessibility to the secret in the first location is restricted after provisioning the escrow TEE instance with the secret. The escrow TEE instance is configured to obtain a cryptographic measurement associated with the application TEE instance, validate the application TEE instance, and provide the secret from a second location to the application TEE instance.

20 Claims, 6 Drawing Sheets

(56) References Cited

OTHER PUBLICATIONS

Advanced Micro Devices, Inc.; "Secure Encrypted Virtualization API—Version 0.16"; Publication # 55766 | Revision: 3.06 | Feb. 2018 | pp. 1-99.

Joseph I. Choi and Kevin R. B. Butler; "Secure Multiparty Computation and Trusted Hardware: Examining Adoption Challenges and Opportunities"; Department of Computer and Information Science and Engineering, University of Florida, USA | vol. 2019 | Article ID 1368905 | Apr. 2, 2019 | 28 pages.

David Kaplan, Jeremy Powell, Tom Woller; "AMD Memory Encryption"; © 2016 Advanced Micro Devices, Inc.; Apr. 21, 2016; 12 Pages.

Brian McGillion, Tanel Dettenborn, Thomas Nyman, N. Asokan; "Open-TEE—An Open Virtual Trusted Execution Environment" | Intel Collaborative Research Institute for Secure Computing (ICRI-SC) at Aalto University, Finland; Aalto University and University of Helsinki, Finland | Jun. 30, 2015 | 11 Pages.

Jianping Zhu, Rui Hou, XiaoFeng Wang, Wenhao Wang, Jiangfeng Cao, Lutan Zhao, Fengkai Yuan, Peinan Li, Zhongpu Wang, Boyan Zhao, Lixin Zhang, Dan Meng; "Enabling Privacy-Preserving, Compute- and Data-Intensive Computing using Heterogeneous Trusted Execution Environment" | State Key Laboratory of Information Security, Institute of Information Engineering, CAS and University of Chinese Academy of Sciences, Indiana University Bloomington; Institute of Computing Technology, CAS | Accessed on or before Feb. 26, 2020 | 16 Pages.

* cited by examiner

SPLIT SECURITY FOR TRUSTED EXECUTION ENVIRONMENTS

BACKGROUND

Trusted execution environments, such as trusted virtual machines may be used to emulate all or a portion of a computer system. The trusted execution environments allow running various software modules, for example, multiple operating systems, concurrently and in isolation from other software modules, on one or more interconnected physical computer systems. Additionally, trusted execution environments may, for example, allow for consolidating multiple physical servers into one physical server running multiple guest virtual machines in order to improve the hardware utilization rate.

Trusted execution environments may include containers, enclaves and virtual machines. Virtualization may be achieved by running a software layer, often referred to as a hypervisor, above the hardware and below the trusted execution environment, such as guest virtual machines or containers. A hypervisor may run directly on the server hardware without an operating system beneath it or as an application running on a traditional operating system. A hypervisor may virtualize the physical layer and provide interfaces between the underlying hardware and trusted execution environments. In some cases, the trusted execution environments may be encrypted for security purposes. Additionally, validation or attestation of launched trusted execution environments may occur for security purposes.

SUMMARY

The present disclosure provides new and innovative systems and methods for split security for trusted execution environments, such as a virtual machines ("VMs"), containers and enclaves. In an example, a system includes a memory, an application trusted execution environment ("TEE") instance, an escrow TEE instance, and a server. The server is configured to receive a request to start the application TEE instance and launch the escrow TEE instance provisioned with a secret. The secret is initially accessible from a first location until the escrow TEE instance is provisioned and accessibility to the secret in the first location is restricted after provisioning the escrow TEE instance with the secret. The escrow TEE instance is configured to obtain a cryptographic measurement associated with the application TEE instance, validate the application TEE instance, and provide the secret from a second location to the application TEE instance.

In an example, a method includes receiving a request to start an application TEE instance and launching an escrow TEE instance provisioned with a secret. The secret is initially accessible from a first location and accessibility to the secret in the first location is restricted after provisioning the escrow TEE instance with the secret. The method also includes obtaining a cryptographic measurement associated with the application TEE instance, validating the application TEE instance, and providing the secret from a second location to the application TEE instance.

In an example, a non-transitory machine-readable medium stores code, which when executed by a processor is configured to receive a request to start an application TEE instance and launch an escrow TEE instance provisioned with a secret. The secret is initially accessible from a first location and accessibility to the secret in the first location is restricted after provisioning the escrow TEE instance with the secret. The non-transitory machine-readable medium is also configured to obtain a cryptographic measurement associated with the application TEE instance, validate the application TEE instance, and provide the secret from a second location to the application TEE instance.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
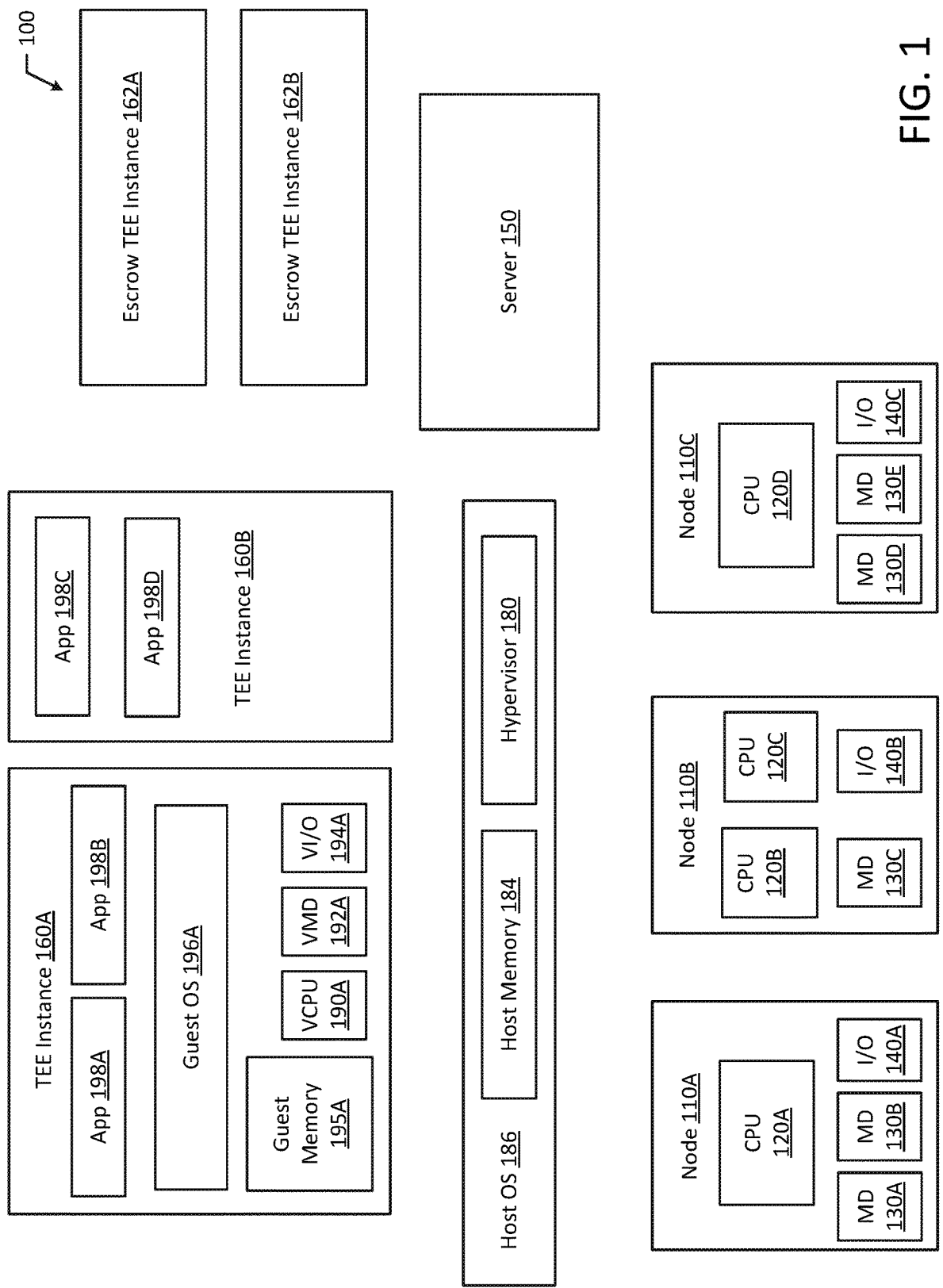
FIG. 1 illustrates a block diagram of an example computer system according to an example embodiment of the present disclosure.

Techniques are disclosed for providing split security while launching trusted execution environments ("TEEs"), such as a virtual machines ("VMs"), containers and enclaves. Modern hardware supports trusted execution environment ("TEE") techniques where a supervisor of a host computer does not have access to memory of a specific TEE, such a trusted container, a trusted virtual machine, or a trusted software enclave running on the host computer. For example, the supervisor may lack access to the memory of the TEE because the memory is protected by host hardware or host firmware. Memory encryption is one such technique to protect the memory of the TEE. In an example, encrypted memory may be used to support and protect running sensitive workloads in the cloud.

Launching a TEE instance, such as a trusted container, by a cloud provider typically involves using a secret that is private to the TEE instance owner and unavailable to the cloud provider. For example, a disk image of the TEE instance (e.g., disk image of the trusted container) may be encrypted with a secret key. However, providing this secret to the TEE instance (e.g., trusted container) presents a challenge. One way to provide the secret to the TEE instance is by having the host hardware or the host firmware first provide a measurement (e.g., cryptographic measurement) of the TEE instance owner. The measurement (e.g., cryptographic measurement) may be used for attestation or validation to ensure that the TEE instance runs under a trusted environment and is protected from the supervisor or hypervisor. After verifying that the TEE instance runs under a trusted environment and is protected from the supervisor or hypervisor, the TEE instance owner's secret is encrypted and forwarded to the TEE instance. For example, the secret may be provided to a trusted container in an encrypted form and in a container specific way.

However, providing the secret to the TEE instance in this way typically requires the TEE instance owner to maintain a service (e.g., attestation service) for verifying the measurement and providing the encrypted secret. Additionally, the service (e.g., attestation service) is typically required to be accessible to the cloud provider, but outside of the cloud provider's control. In an example, the service is envisioned to be hosted on the TEE instance owner's private cloud. However, hosting the service on the TEE instance owner's private cloud is inappropriate for workloads that launch and shut down TEE instances (e.g., trusted containers) at a high rate. For example, should the private cloud become unavailable, the ability to launch new TEE instances would become unavailable. Additionally, if the private cloud slows down and in unable to serve requests, the ability to launch new TEE instances would be halted and unavailable until the private cloud is again able to serve requests.

Furthermore, continually providing access to the memory location (e.g., private cloud) with the secret may corrupt the memory location through exposure to malicious entities, such as a malicious hypervisor or malicious application TEE instances, which may endanger the original memory location (e.g., private cloud) from properly validating application TEE instances in the future.

Providing attestation through a private cloud often requires that the TEE instances are not treated as "cattle" where they are started up and shut down at will. Instead, the TEE instances are treated as "pets" and carefully migrated live without shutting down. However, live migration increases costs for the cloud providers and the TEE instance owners. For example, treating the TEE instances as "pets" that are migrated live increases hardware utilization and creates additional overhead (e.g., due to successive iterations of memory pre-copying that consumes extra CPU cycles on both source and destination servers).

Another technique for providing attestation services to TEEs is to use a quoting TEE instance (e.g., quoting enclave) that runs on the same platform as the TEE instances (e.g., enclaves) being attested. The quoting enclave provides attestation services to the application enclaves by signing their attestation reports. For example, the quoting enclave may verify attestation reports for the platform and the quoting enclave may hold the platforms attestation key. In an example, multiple attesting enclaves may create respective attestation reports for the quoting enclave and the quoting enclave verifies the report and signs the report with the attestation key. Then, off-platform tenants may go through a verification process to obtain the attestation information. For example, the verification of a quote by an off-platform tenant involves verifying that a Provisioning Certification Key ("PCK") embedded in the quote is valid. For example, verification of the quote may be achieved by using the PCK certificate chain obtained from a manufacturer associated with the enclave (e.g., Intel as a SQX processor that utilizes the quoting enclaves). Then, verifying the key associated with the PCK certification is the one that signed the platform's attestation key (e.g., signed the hash of the platform's attestation key). Verification of the quote also includes verifying that the attestation key was the one that signed the quote and also verifying that the hash of the attestation key embedded in the quote is correct.

To provide increased security through a split security configuration for TEEs while still allowing for high availability, the systems and methods disclosed herein advantageously run attestation on application TEE instances that include clone service(s) that maintain keys and/or secrets for cloning after accessibility of the keys and/or secrets from the original location is restricted. As used herein, an application TEE instance that includes a clone service may be referred to as an escrow TEE instance when performing validation services. For example, the keys and/or secrets may originally be stored in a memory location associated with an external computer network, such as a private cloud, which may be air gapped after provisioning the clone service(s) (e.g., escrow TEE instances) with the keys and/or secrets. Therefore, the keys and/or secrets stored in the memory location are protected from future malicious attacks since access to that memory location, by various applications (e.g., application TEE instances) running on the cloud, is now disabled. If such an attack is detected while using the application TEE instances including the clone service(s), the clone service(s) (e.g., escrow TEE instances) may be shutdown or disabled.

Instead of having attestation services exclusively or fully run in a private cloud, TEEs such as trusted escrow containers may be used to provide attestation services. For example, without solely relying on and maintaining an attestation service in a private cloud, the private cloud is protected from continuous security threats while validating (e.g., attesting) launched applications because access to the private cloud may be disabled after launching an escrow TEE instance (e.g., application TEE instance with clone service). For example, while providing attestation services, the private cloud may be vulnerable to attacks from various applications (e.g., application TEE instances) requesting validation to complete start-up. Furthermore, running attestation on clone service(s) that maintain keys and/or secrets (e.g., after accessibility of the keys and/or secrets from the original location is restricted) eliminates the need of live migration, reduces the reliance on private cloud attestation services, eliminates the numerous verification steps associated with quoting enclaves, and improves the latency of launching TEE instances (e.g., containers, virtual machines or enclaves).

When receiving a request to start an application TEE instance, an escrow TEE instance may also be launched and provisioned with a secret if a respective escrow TEE instance is not already running. In an example, the escrow TEE instance may be a previously launched application TEE instance that includes an escrow or clone service. For example, once the escrow TEE instance is launched and running, the escrow TEE instance may validate (e.g., perform attestation) for newly launched application TEE instances. The secret is initially accessible from a first location, such as a memory location on a private network or private cloud until the escrow TEE instance is provisioned. After provisioning the escrow TEE instance, accessibility to the secret is restricted, for example, access to the private network may be restricted or the secret may be removed from the memory location on the private network. Conversely, if the private cloud handled each validation and attestation, the memory location may be susceptible to attack from different pieces of software and guests attempting to launch.

As mentioned above, along with the additional benefits of split security, the escrow TEE instances also eliminate the need of live migration. For example, the systems and methods described herein includes escrow TEE instances that validate guests (e.g., application TEE instances), as opposed to systems that attest each guest (e.g., application TEE instance) through communication with a remote tenant. Additionally, the escrow TEE instances (e.g., escrow containers) do not have to run on the same platform as the application TEE instances (e.g., application containers) being launched since the escrow TEE instances do not rely on the platform to provide security. In contrast, the quoting enclave example described above relies on the platform to provide security and the tenant needs to be contacted to have the tenant verify the attestation and supply the secret. Lastly, the systems and methods described herein do not require any special machinery for the escrow TEE instance (e.g., escrow container) because the escrow TEE instance is a trusted TEE instance, like the application TEE instance or any other trusted TEE instance, and is treated as such.

FIG. 1 depicts a high-level component diagram of an example computing system 100 in accordance with one or more aspects of the present disclosure. The computing system 100 may include an operating system (e.g., host OS 186), one or more TEEs (e.g., TEE instances 160A-B and escrow TEE instances 162A-B), a cloud provider (e.g., server 150), and nodes (e.g., nodes 110A-C).

An application TEE instance (e.g., TEE instance 160A) may be a virtual machine, container, enclave, etc. and may include a guest OS, guest memory, a virtual CPU (VCPU), virtual memory devices (VMD), and virtual input/output devices (VI/O). For example, TEE instance 160A may include guest OS 196A, guest memory 195A, a virtual CPU 190A, a virtual memory devices 192A, and virtual input/output device 194A. Virtual machine memory 195A may include one or more memory pages. Similarly, TEE instance 160B may include a guest OS, guest memory, a virtual CPU, virtual memory devices, and virtual input/output devices.

The computing system 100 may also include a supervisor or hypervisor 180 and host memory 184. The supervisor or hypervisor 180 may manage host memory 184 for the host operating system 186 as well as memory allocated to the TEEs (e.g., TEE instances 160A-B and escrow TEE instances 162A-B) and guest operating systems (e.g., guest OS196A such as guest memory 195A provided to guest OS 196A. Host memory 184 and guest memory 195A may be divided into a plurality of memory pages that are managed by the supervisor or hypervisor 180. Guest memory 195A allocated to the guest OS 196A may be mapped from host memory 184 such that when an application 198A-D uses or accesses a memory page of guest memory 195A, the guest application 198A-D is actually using or accessing host memory 184.

In an example, a TEE instance (e.g., TEE instance 160A-B), such as a virtual machine, container or enclave may execute a guest operating system 196A and run applications 198A-B which may utilize the underlying VCPU 190A, VMD 192A, and VI/O device 194A. One or more applications 198A-B may be running on a TEE, such as virtual machine, under the respective guest operating system 196A. TEEs (e.g., TEE instances 160A-B and escrow TEE instances 162A-B, as illustrated in FIG. 1) may run on any type of dependent, independent, compatible, and/or incompatible applications on the underlying hardware and OS. In an example, applications (e.g., App 198A-B) run on a TEE, such as a virtual machine, and may be dependent on the underlying hardware and/or OS 186. In another example, applications 198A-B run on a TEE, such as a virtual machine, and may be independent of the underlying hardware and/or OS 186. For example, applications 198A-B running on a first TEE instance 160A may be dependent on the underlying hardware and/or OS 186 while applications (e.g., application 198C-D) running on a second TEE instance 160B are independent of the underlying hardware and/or OS 186A. Additionally, applications 198A-B running on TEE instance 160A may be compatible with the underlying hardware and/or OS 186. In an example, applications 198A-B running on a TEE instance 160A may be incompatible with the underlying hardware and/or OS 186.

The cloud provider (e.g., server 150) may host both the application TEE instances 160A-B and the escrow TEE instances 162A-B alongside each other. For example, the cloud provider may launch the escrow TEE instances 162A-B on the same server 150 or in the same datacenters as the application TEE instance(s) 160A-B. For example, the server 150 may receive a request to start an application, which may include one or more application TEE instances 160A-B. Then, the server 150 may launch escrow TEE instance(s) 162A-B such that the escrow TEE instance(s) 162A-B are hosted alongside the application TEE instance(s) 160A-B.

Figure 2A:
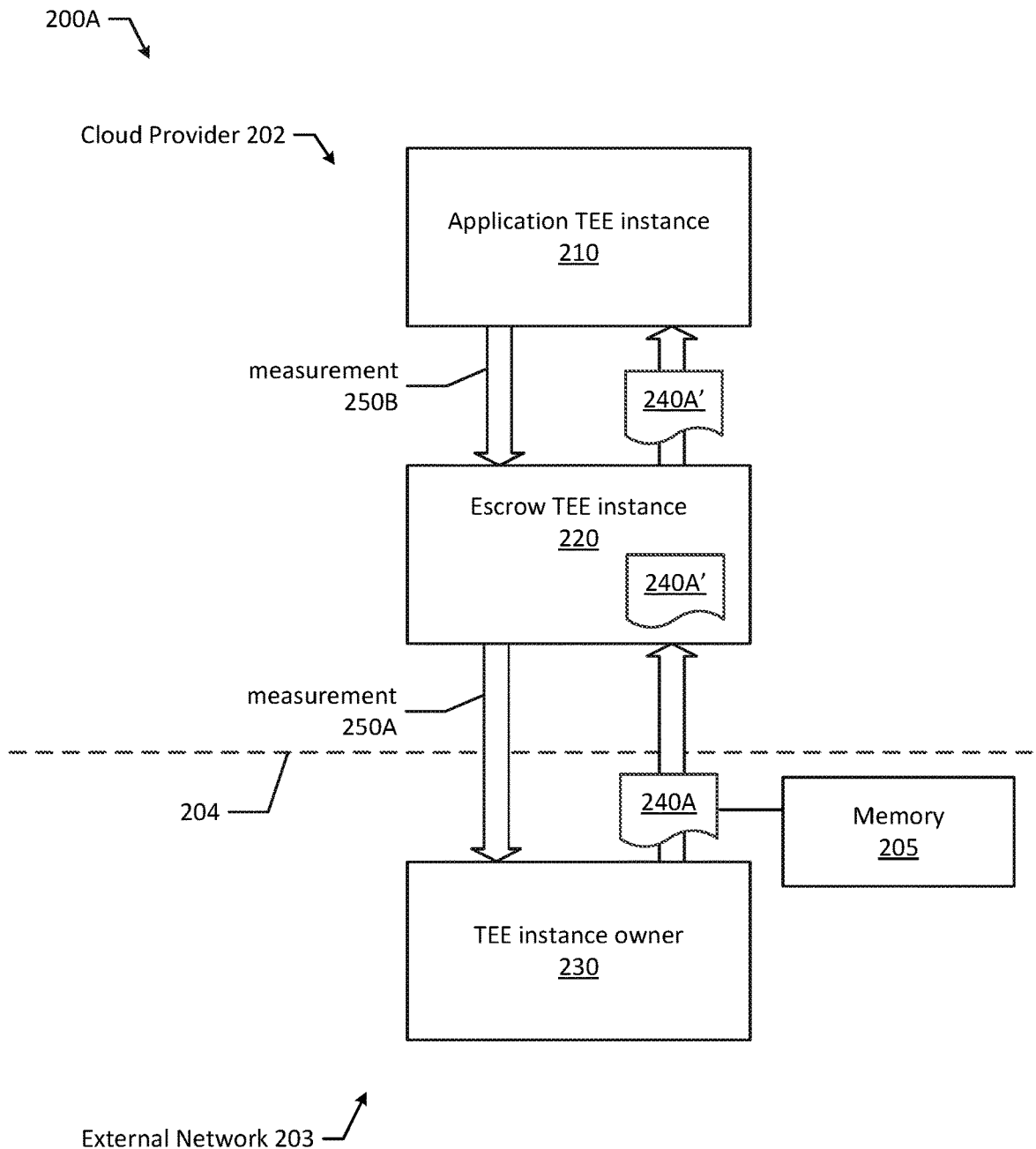
FIG. 2A illustrates a block diagram of an example split security system for launching TEE instances according to an example embodiment of the present disclosure.
Figure 2B:
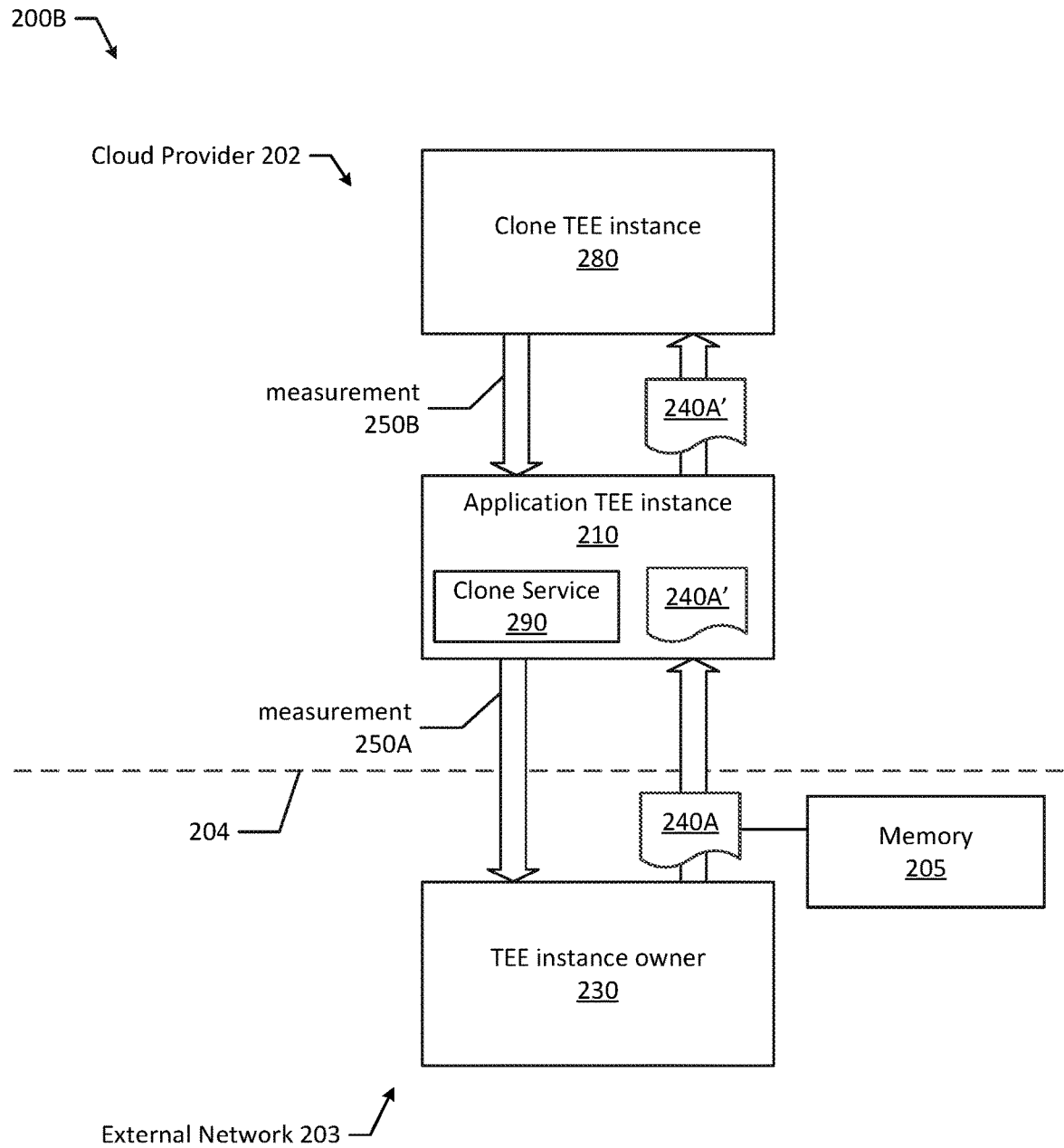
FIG. 2B illustrates a block diagram of an example split security system for launching TEE instances according to an example embodiment of the present disclosure.

As mentioned above, the escrow TEE instance(s) 162A-B may be application TEE instance(s) 160A-B that include a clone service (see FIG. 2B). For example, the escrow TEE instances 162A-B may serve application requests similar to the application TEE instances 160A-B. However, upon request, the escrow TEE instances 162A-B may stop serving application requests and instead validate another new application TEE instance 160A-B such that the new application TEE instance can complete start-up. For example, the escrow TEE instances 162A-B may provide the newly started application TEE instance 160A-B with a secret, key or key-secret pair. The escrow TEE instances 162A-B may be used to clone and validate application TEE instances 160A-B without the cloned application TEE instances 160A-B accessing the secret, key or key-secret pair from the original memory location (e.g., a private cloud), which advantageously protects the original memory location from security threats during validation.

The escrow TEE instance(s) 162A-B may be enclaves that provide validation (e.g., attestation) services for containers or virtual machines. In another example, the escrow TEE instance(s) 162A-B may be virtual machines that provide validation (e.g., attestation) services for containers or enclaves. Therefore, the system advantageously provides additional security while launching TEE instance(s) without requiring the escrow TEE instance(s) 162A-B to run on the same platform as the application TEE instance(s) 160A-B being launched, which provides additional flexibility while maintaining security. For example, the systems and methods described herein do not rely on the platform to provide security, which is typically required when using quoting enclaves. Furthermore, using a quoting enclave requires contacting the tenant to perform the validation, which as described above, may pose a problem if the tenant is unable to be reached (e.g., tenant's attestation services going offline or slowing down).

The server 150 may include hardware, such as processor(s), memory, hard drives, network adapters for network connection, etc. For example, server 150 may include many of the same hardware components as nodes 110A-C.

The computer system 100 may include one or more nodes 110A-C. Each node 110A-C may in turn include one or more physical processors (e.g., CPU 120A-D) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. TEE instances 160A-B may be provisioned on the same host or node (e.g., node 110A) or different nodes. For example, TEE instance 160A and TEE instance 160B may both be provisioned on node 110A. Alternatively, TEE instance 160A may be provided on node 110A while TEE instance 160B is provisioned on node 110B.

As used herein, physical processor, processor or CPU 120A-D, refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-D) may be interconnected using a variety of techniques, ranging from a point-to-point processor interconnect, to a system area network, such as an Ethernet-based network. Local connections within each node, including the connections between a processor (e.g., CPU 120A-D) and a memory device 130A-D may be provided by one or more local buses of suitable architecture, for example, peripheral component interconnect (PCI).

FIG. 2A illustrates a block diagram of a split security system 200 for launching or cloning TEE instances. As illustrated in FIG. 2A, a TEE instance owner 230 may request starting an application instance or cloning an application instance (e.g., application TEE instance 210). In an example, an application may include multiple TEE instances. For example, an application may consist of a number of trusted application containers. Upon requesting to start or clone an application instance (e.g., application TEE instance 210), a cloud provider 202, such as server 150, may launch a trusted escrow TEE instance 220. For example, the escrow TEE instance 220 may be launched to provide validation (e.g., attestation) services to the newly started or cloned application instance (e.g., application instance 210) without having the newly started or cloned application instance communicating with the TEE instance owner 230. In an example, the trusted escrow TEE instance 220 may have already been launched. Additionally, the trusted escrow TEE instance may be another application TEE instance 210 with a cloning or attestation service (described in more detail in FIG. 2B). The cloud provider 202 may launch the trusted escrow TEE instance 220 in the same datacenters as the application TEE instance(s) 210.

The escrow TEE instance 220 is provisioned with a secret 240A that is initially accessible from memory 205 and accessibility to the secret 240A is restricted after provisioning the escrow TEE instance 220 with the secret 240A. In an example, the TEE instance owner 230 may originally provide secret 240A over a network through network interface 204 from an external network 203 or a private cloud separate from cloud provider 202 (e.g., server 150). Alternatively, the TEE instance owner 230 may be executing within the cloud of cloud provider 202.

In an example, after provisioning the escrow TEE instance with secret 240A, access to the memory 205 may be disabled or removed by air gapping the memory 205. For example, by air gapping memory 205 may be achieved by disabling the network interface 204 and preventing further communication to the external network 203. An air gap or air gapping is a network security measure employed to ensure that a secure computer network (e.g., computer network associated with memory 205) is physically isolated from other networks. For example, an air gap may indicate that there are no network interfaces connected between memory 205 and cloud provider 202 where the escrow TEE instance 220 is provisioned.

Typically, even when a computer network is not physically plugged into a wired network, the computer network may be associated with a wireless network interface controller that is connected to nearby wireless networks. These network connections represent a security vulnerability, so air gapping the computer network associated with memory 205 may include permanently disabling or physically removing wireless interface controller(s) of the computer network. After the computer network is air gapped, to move data to the air gapped system (e.g., memory 205), data may be written to a physical medium such as a thumbdrive and physically moved to the air gapped system. By restricting data transfer to physical access, security to the air gapped system is easier to control than an electronic network interface, which can be attacked at any time from an exterior insecure system (e.g., malware that is used to export secure data).

In an example, the escrow TEE 220 may be validated before being provisioned with the secret 240A. For example, a measurement 250A of the escrow TEE instance 220 may be obtained by the TEE instance owner 230 and if the measurement is validated by the TEE instance owner 230, the TEE instance owner 230 may provide a key or secret 240A to the escrow TEE instance 220. In an example, the escrow TEE instances 220 may be provided the key 240A on the escrow disk image or the escrow TEE instances may retrieve the key from the TEE instance owner 230.

After the escrow TEE instance 220 is provisioned with the secret 240A, the escrow TEE instance 220 may obtain a cryptographic measurement 250B associated with the application TEE instance 210. Based on the cryptographic measurement 250B, the escrow TEE instance 220 may validate the application TEE instance 210 (e.g., by comparing the cryptographic measurement 250B to a reference measurement or an integrity record). After validation, the escrow TEE instance may provide the secret 240A' to the application TEE instance 210. As illustrated in FIG. 2A, the secret 240A' provided to the application TEE instance 210 is stored at a different location than memory 205. Once the escrow TEE instance 220 provides the key or secret 240A to the application TEE instance 210, the application TEE instance 210 can finish launching. The validation process 270 between the escrow TEE instance 220 and the application TEE instance 210 advantageously occurs without the risks associated with a private cloud going off-line or slowing down since both the escrow TEE instance 220 and the application TEE instance 210 are hosted on the same server 150 or datacenters. Furthermore, re-using trusted TEE instances (e.g., escrow TEE instance 220) for attestation allows low latency and high availability without reducing security.

For example, as illustrated in FIG. 2A, escrow TEE instance 220 holds secret 240A' for launching application TEE instance(s) 210, as opposed to attesting each application TEE instance 210 via a remote tenant or private cloud. Instead of entirely running the attestation services or validation services in a single private cloud, attestation services may run on a number of trusted containers such as trusted escrow TEE instances 220, which provides high availability without reducing security. For example, multiple escrow TEE instances 220 may provide attestation services to application TEE instances 210 while the security of memory 205 is maintained via an air gap. These attestation services may be performed without further communicating with the TEE instance owner 230 or accessing the memory 205.

FIG. 2B illustrates a block diagram of a split security system 200B for launching or cloning TEE instances. As illustrated in FIG. 2B, a TEE instance owner 230 may request starting an application instance or cloning an application instance (e.g., application TEE instance 210). In an example, an application may include multiple TEE instances. For example, an application may consist of a number of trusted application containers. Upon requesting to start or clone an application instance (e.g., application TEE instance 210), a cloud provider 202, such as server 150, may launch a trusted application TEE instance 210 with a clone service 290. In an example, the application TEE instance 210 with the escrow service or clone service 290 may have already been launched. Specifically, the application TEE instance 210 with clone service 290 may perform the same validation (e.g., attestation) services as the escrow TEE instance 220 of FIG. 2A.

The application TEE instance 210 may be provisioned with a secret 240A that is initially accessible from memory 205 and accessibility to the secret 240A is restricted after provisioning the application TEE instance 210 with the secret 240A. The TEE instance owner 230 may originally provide secret 240A over a network through network interface 204 from an external network 203 or a private cloud separate from cloud provider 202 (e.g., server 150). Alternatively, the TEE instance owner 230 may be executing within the cloud of cloud provider 202. In an example, restricting access to the memory 205 may be achieved by air gapping the memory 205 thereby disabling the network interface 204 and preventing further communication to the external network 203.

Similar to FIG. 2A, the application TEE instance 210 may be validated before being provisioned with the secret 240A. For example, a measurement 250A of the application TEE instance 210 may be obtained by the TEE instance owner 230 and if the measurement is validated by the TEE instance owner 230, the TEE instance owner 230 may provide a key or secret 240A to the application TEE instance 210 with the clone service 290. In an example, the application TEE instances 210 may be provided the key 240A on the disk image or the application TEE instance 210 may retrieve the key from the TEE instance owner 230.

After the application TEE instance 210 is provisioned with the secret 240A, the application TEE instance 210 may create a clone TEE instance 280. After launching the clone TEE instance 280, which may be identical to the application TEE instance 210, the application TEE instance 10 may obtain a cryptographic measurement 250B associated with the clone TEE instance 280. Based on the cryptographic measurement 250B, the application TEE instance 210 with clone service 290 may validate the clone TEE instance 280 (e.g., by comparing the cryptographic measurement 250B to a reference measurement, an integrity record, an attestation record, etc.). After validation, the application TEE instance 210 may provide the secret 240A' to the clone TEE instance 280. As illustrated in FIG. 2B, the secret 240A' provided to the clone TEE instance 280 is stored at a different location than memory 205. Once the application TEE instance 210 provides the key or secret 240A to the clone TEE instance 280, the clone TEE instance 280 can finish launching. The clone TEE instance 280 may include its own clone service such that the clone TEE instance 280 may also launch and clone additional TEE instances.

As illustrated in FIG. 2B, application TEE instance 210 holds secret 240A' for launching or cloning additional clone TEE instance(s) 280, as opposed to attesting each application TEE instance 210 via a remote tenant or private cloud. Instead of entirely running the attestation services or validation services in a single private cloud, attestation services may run on a number of application TEE instances 210 after access has been restricted to the private cloud, which provides additional security. For example, multiple application TEE instances 210 with clone services 290 may provide attestation services to clone TEE instances 280 while the security of memory 205 is maintained via an air gap or other type of memory protection technique. These attestation services may be performed without the TEE instance owner 230 from running and maintaining an attestation service in a private cloud.

Measurements 250A-B described above may be cryptographic measurements that identify characteristics of the application TEE instance(s) 210 such as the type of application TEE instance 210, version of the TEE instance 210, description of software components loaded into the TEE instance 210, etc. Additional examples of cryptographic measurements are described in more detail below.

Figure 3:
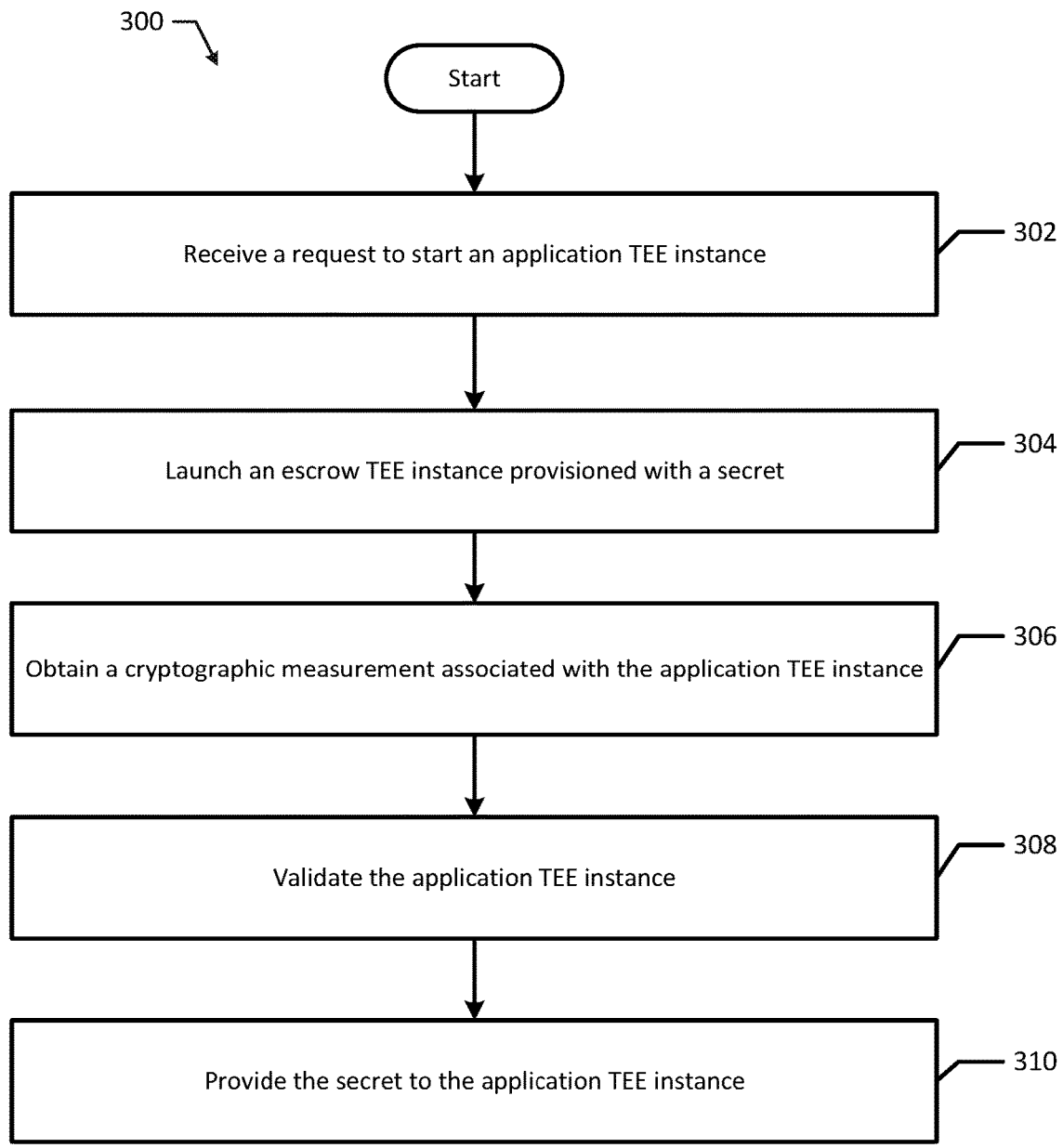
FIG. 3 illustrates a flowchart of an example process for split security while launching TEE instances according to an example embodiment of the present disclosure.

FIG. 3 illustrates a flowchart of an example method 300 for split security while launching TEE instances in accordance with an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. The method 300 may be performed by processing logic that may comprise hardware (circuitry, dedicated logic, etc.), software, or a combination of both.

In the illustrated example, method 300 includes receiving a request to start an application TEE instance (block 302). For example, a cloud provider 202 or a server 150 may receive a request to start an application TEE instance 210. It should be appreciated that application TEE instance 210 of FIG. 2 may represent TEE instance(s) 160A or 160B of FIG. 1, which may each be referred to generally as application TEE instance 210. Method 300 also includes launching an escrow TEE instance provisioned with a secret (block 304). For example, the cloud provider 202 or the server 150 may launch the escrow TEE instance 220 provisioned with a secret 240A. It should be appreciated that escrow TEE instance 220 of FIG. 2 may represent escrow TEE instances 162A-B of FIG. 1, which may each be referred to generally as escrow TEE instance 220. The escrow TEE instance 220 may be application TEE instances 210 that are capable of serving application requests while acting as an application TEE instance 210 and may stop to instead validate or clone other application TEE instances 210. For example, the escrow TEE instance 220 may be an application TEE instance 210 that includes a clone service 290.

In an example, the secret is initially accessible from a first location (e.g., a first memory location or memory 250) until the escrow TEE instance 220 is provisioned. Then, access to the secret from the first location (e.g., memory 250) is restricted after provisioning the escrow TEE instance 220 with the secret 240A. For example, access may be restricted by air gapping the server 150 or cloud provider 202 from the first location (e.g., memory 250). Additionally, the memory 250 may be write-protected, non-executable, etc. to restrict or prevent further access to the memory 250. For example, protection identifiers in a page table may be changed to write-protected, read-only, restricted, etc. to provide additional security to the memory 250. In other scenarios, the secret may be removed or deleted from the first location (e.g., memory 250).

Additionally, method 300 includes obtaining a cryptographic measurement associated with the application TEE instance (block 306). For example, the escrow TEE instance 220 may obtain a cryptographic measurement associated with the application TEE instance 210. The cryptographic measurement may include measurements of files, BIOS, bootloaders, virtual memory, components, images, internal configurations, current software or applications run by the TEE, etc. For example, components of the boot of the application TEE instance may be cryptographically measured (e.g., each boot component may be measured either individually or collectively by computing the hash values of byte arrays representing the boot components). The measured values of the boot components may then be used to decide if the application TEE instance can be trusted. Additionally, the measurement or hash may represent a fingerprint of the measured files.

In another example, the cryptographic measurement may include a measurement value that is a hash value of the files associated with the application TEE instance. In another example, a cryptographic measurement may be taken from one or more of the application TEE images. The measurement may be compared to integrity records or attestation records from a reference measurement. In some cases, the measurement may also indicate the origin of the measured information, which may help attest that the origin of the information is a trusted source.

Method 300 also includes validating the application TEE instance (block 308). For example, the escrow TEE instance 220 may validate the application TEE instance 210. Validation or attestation may occur by validating the cryptographic measurement 250B. Then, method 300 includes providing the secret to the application TEE instance (block 310). For example, the escrow TEE instance may provide the secret 240A' from a second location to the application TEE instance 210. The secret 240A' or key may involve symmetric encryption or asymmetric encryption. Symmetric encryption is an encryption process that uses a single key for both encryption and decryption. In symmetric encryption, the same key is available to multiple entities (e.g., nodes, TEE instances 210, etc.). Asymmetric encryption uses key pairs or key-secret pairs that may each include a private key and a public key. In an example, the private key is known only to a respective entity (e.g., escrow TEE instance 220), and the public key is known to a group of entities in the network (e.g., each application TEE instance 210). An application TEE instance 210 may use the public key to encrypt data, and the encrypted data can be decrypted using the escrow TEE instances 220 private key.

The encryption and decryption may utilizing hashing functions such as the Secure Hash Algorithm ("SHA") (e.g., SHA-128, SHA-256, etc.) or other hashing functions such as MD5. For example, the secret 240A' or key may appear to be a random string of numbers and letters (e.g., 140FA9Z425ED694R018019B492). Additionally, the encryption and decryption processes may be performed according to the Advanced Encryption Standard ("AES"). AES is based on a design principle known as a substitution-permutation network, and may utilize keys with a key size of 128, 192, or 256 bits.

The second location is different than the first location (e.g., memory 250) because access to the first location is now restricted. By restricting access to the first location, the first memory location is secure from future security attacks from guests attempting to launch and/or validate additional application TEE instances 210. If a thread or security breach does occur, the contaminated escrow TEE instance 220 may be disabled or shut-down to eliminate the security breach.

Figure 4:
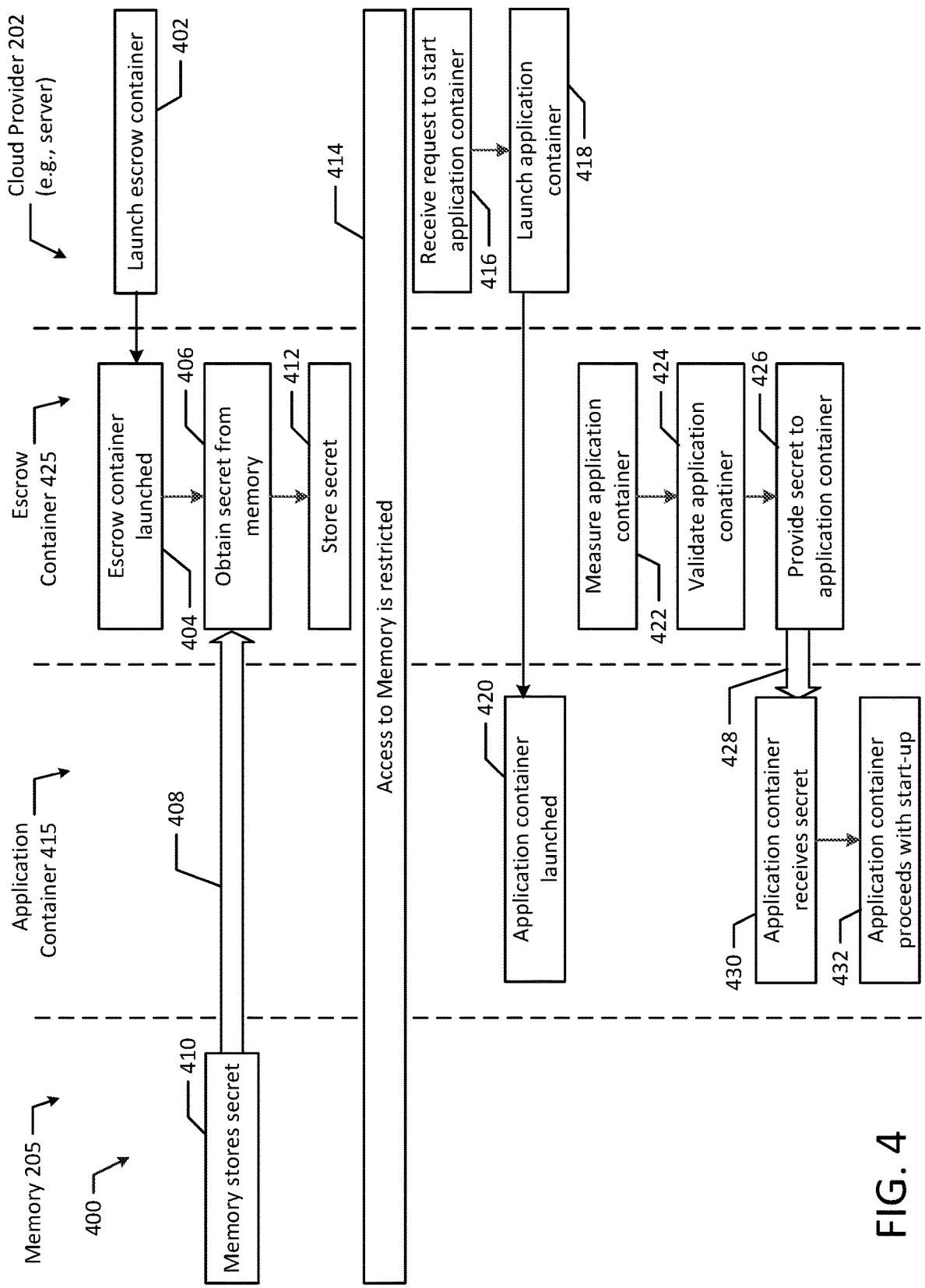
FIG. 4 illustrates a flow diagram of an example process for split security while launching TEE instances according to an example embodiment of the present disclosure.

FIG. 4 depicts a flow diagram illustrating an example method 400 for split security while launching TEE instances according to an example embodiment of the present disclosure. Although the example method 400 is described with reference to the flow diagram illustrated in FIG. 4, it will be appreciated that many other methods of performing the acts associated with the method may be used. For example, the order of some of the blocks may be changed, certain blocks may be combined with other blocks, blocks may be repeated, and some of the blocks described are optional. The method may be performed by processing logic that may comprise (e.g., circuitry, dedicated logic, etc.), software, or a combination of both. For example, memory 205, application container 415, escrow container 425 a cloud provider 202 may communicate to perform example method 400.

In the illustrated example, the cloud provider 202 may launch an escrow container 425 (block 402). In an example, the escrow container 425 may be an application container 415 with an escrow or cloning service. For example, the escrow container 425 may be capable of serving application requests as well as validating other application containers 415. The escrow container 425 is launched (block 404). In an example, the escrow container 415 may already be launched and running on the server 150 or cloud. However, the escrow container 425 may be launched responsive to receiving a request to start an application, such as an application container 415.

The escrow container 425 may be launched and provisioned with a secret. In the illustrated example, the escrow container 425 obtains the secret 408 from memory 205 (block 406). For example, the secret 408 may be stored in the memory 205 (block 410). The memory 205 may be part of an external computer network that is separate from the cloud provided by cloud provider 202 or server 150. The escrow container 425 also stores the secret 408 (block 412).

Then, access to memory 205 is restricted (block 414). For example, memory 205 may be air gapped from the cloud hosting application containers 415 and escrow containers 425. In other examples, access to memory 205 may be restricted by deleting the secret 408 from the memory, removing the secret 408 from the memory, or associating the memory with a protection identifier that restricts access via a page table.

Then, the cloud provider 202 may receive a request to start or clone an application container 415 (block 416). A container owner may send a request to start or clone an application due to increased traffic that requires additional application instances to handle the load. In other examples, the request to start the application may be to launch a new version or new release of the application in the cloud. Then, the cloud provider 202 launches the application container 415 (block 418). The application container 415 is launched (block 420), but has not yet started providing runtime services. Even though application container 415 is launched and running, the container 415 has not yet been validated and therefore is not allowed to proceed with start-up.

For example, validation or attestation may be required to ensure that the application containers 415 are authorized for deployment. Validation may provide an endorsement that the application container 415 was launched by a trusted platform and that the application container's code is endorsed by a trusted entity. Allowing an application container 415 to proceed with start-up without validating or attesting the application container 415 may allow untrusted applications (e.g., malicious applications) to start-up and cause security breaches.

In the illustrated example, the escrow container 425 measures the application container 415 (block 422). For example, the escrow container 425 may cryptographically measure the application container 415. The cryptographic measurement may include measurements of files, BIOS, bootloaders, virtual memory, components, images, internal configurations, current software or applications run by the TEE, etc. Then, the escrow container 425 validates the application container 425 (block 424). For example, the escrow container 425 may validate the application container 415 based on the cryptographic measurement. Validation or attestation may occur if the cryptographic measurement matches a reference measurement. For example, if the cryptographic measurement produces a measurement value (e.g., hash value) that matches a trusted reference measurement, the escrow container 425 may determine that the application container 415 (e.g., clone or cloned container) is trustworthy.

After validation, the escrow container 425 provides the secret 428 to the application container 426 (block 426). The secret 428 provided to the application container 415 may be the same secret 408 obtained by the escrow container 425 at block 408, but is now stored in a different memory location. By providing secrets 428 and attestation services through the escrow container 425 instead of an attestation service hosted on an external network (e.g., private cloud), the external network is protected for security threats associated with accessing the key or secret from the original memory location (e.g., memory 205). The secret 428 or key may involve symmetric encryption or asymmetric encryption. With asymmetric encryption, the secret 428 or key may use key pairs or key-secret pairs. In an example, the encryption and decryption may utilizing hashing functions such as the Secure Hash Algorithm ("SHA") (e.g., SHA-128, SHA-256) or MD5. Additionally, the encryption and decryption processes may be performed according to the Advanced Encryption Standard ("AES") and may utilize keys or secrets 428 with a size of 128, 192, or 256 bits.

Then, the application container 415 receives the secret 428 (block 430). After receiving the secret 428, the application container 415 proceeds with start-up (block 432). For example, the application container 415 may start performing runtime services on the cloud. Additionally, the escrow container 425 may revert back to performing runtime services and serving application requests as it had before cloning another application container. If network traffic increases again and additional application containers 415 need to be cloned, the escrow container 425 may validate additional application containers 415 or application instances that are launched on the cloud, which advantageously provides high availability to attestation or validation services without reducing security. For example, since access to the original source of the secret has been disabled, future cloning or application container launch services do not pose a security threat to the original memory location (e.g., memory 205) of the secret 428, which provides extra security. As mentioned above, if there is a security breach with one of the escrow containers 425, those escrow containers 425 may be shut down.

Additionally, method 400 is capable providing validation (e.g., attestation services) for newly launched application containers 415 via various escrow containers 425 hosted by the same cloud provider 202. Validating (e.g., attesting) application containers 415 with escrow containers 425 hosted by the same cloud provider 202 eliminates the added risk associated with relying on a private cloud for attestation services because the private cloud adds another point of failure (e.g., the private cloud going off-line or slowing down). Furthermore, if the private cloud goes off-line, all attestation services may stop completely. Conversely, multiple escrow container 425 may be launched and running at the same time such that if one of the escrow containers 525 crashes or goes off-line, another escrow container 425 may assume the responsibility of validating (e.g., attesting) application containers 415.

Figure 5:
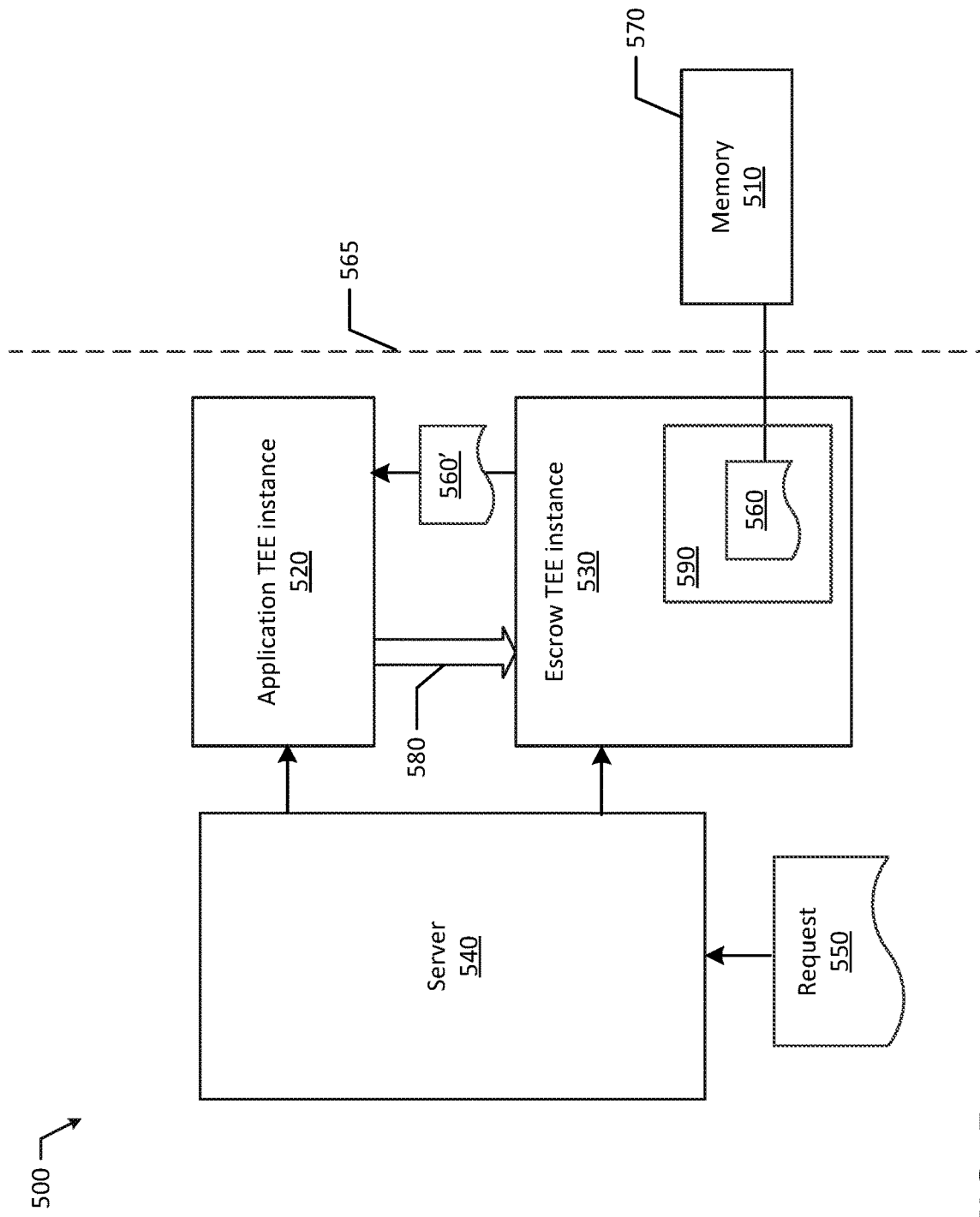
FIG. 5 illustrates a block diagram of an example split security application TEE launching or cloning system according to an example embodiment of the present disclosure.

FIG. 5 is a block diagram of an example split security application TEE launching or cloning system 500 according to an example embodiment of the present disclosure. The system 500 includes a memory 510, an application trusted execution environment (TEE) instance 520, an escrow TEE instance 530, and a server 540. The server 540 is configured to receive a request 550 to start the application TEE instance 520. Additionally, the server 540 is configured to launch the escrow TEE instance 530 provisioned with a secret 560. The secret 560 is initially accessible from a first location 570 until the escrow TEE instance 530 is provisioned and accessibility 565 to the secret 560 in the first location 570 is restricted after provisioning the escrow TEE instance 530 with the secret 560. The escrow TEE instance 530 is configured to obtain a cryptographic measurement 580 associated with the application TEE instance 520, validate the application TEE instance 520, and provide the secret 560' from a second location 590 to the application TEE instance 520. The received secret 560' at the second location 590 is a copy of the secret 560 that was originally accessible from the first location 570.

By restricting access to the first location 570, split security is provided such that security is increased compared to systems that solely rely on attestation services maintained in a private cloud. Additionally, when a private cloud's attestation services go off-line, validating newly launched application TEE instances 520 may be completely halted thereby preventing the application TEE instances 520 from fully starting up and performing runtime services (e.g., serving application requests). Relying solely on a private cloud adds another point of failure and may cause the application to perform poorly or even crash if the private cloud slows down or goes off-line.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
    a memory;
    an application trusted execution environment ("TEE") instance;
    an escrow TEE instance different from the application TEE instance; and
    a server configured to:
        launch the escrow TEE instance provisioned with a secret, wherein the secret is initially accessible from a first location until the escrow TEE instance is provisioned,
        and wherein accessibility to the secret in the first location is restricted after provisioning the escrow TEE instance with the secret, and
        receive a request to start the application TEE instance, and
    wherein the escrow TEE instance is configured to:
        validate the application TEE instance, and
        upon a successful validation of the application TEE instance, provide the secret from a second location to the application TEE instance, wherein the providing of the secret to the application TEE instance allows the application TEE instance to complete the launch;
        upon the receipt of the secret by the application TEE instance, create, by the application TEE instance, a clone TEE instance of the application TEE instance;
        provide the secret to the clone TEE instance by the application TEE instance, wherein the clone TEE instance comprises a service to launch additional clone TEE instances, wherein the clone TEE instance is configured to provide the secret to the additional clone TEE instances; and
        disable at least one of the escrow TEE, the application TEE instance, or the clone TEE instance based upon a security breach of at least one of the escrow TEE instance, the application TEE instance, or the clone TEE instance.

2. The system of claim 1, wherein the escrow TEE instance is configured to take the cryptographic measurement of the application TEE instance prior to validating the application TEE instance.

3. The system of claim 2, wherein the cryptographic measurement identifies characteristics of the application TEE instance including at least one of a type of the TEE instance, a version of the TEE instance, and a description of software components loaded into the TEE instance.

4. The system of claim 2, wherein the cryptographic measurement further includes an integrity code to validate the cryptographic measurement.

5. The system of claim 1, wherein the application TEE instance is an encrypted virtual machine.

6. The system of claim 1, wherein the escrow TEE instance is an encrypted virtual machine, and wherein the escrow TEE instance is another application TEE instance that includes a clone service.

7. The system of claim 1, wherein the memory is hardware encrypted storage.

8. The system of claim 1, wherein restricting accessibility to the secret includes removing the secret from the memory.

9. The system of claim 1, wherein the memory is part of a private network, wherein the escrow TEE instance is part of an outside network, wherein the secret is initially stored in the memory at a first time, and wherein restricting accessibility to the secret includes removing the secret from the memory at a second time immediately after provisioning the escrow TEE instance with the secret.

10. The system of claim 1, wherein the secret is initially stored in the first location on a device at a first time, and after provisioning the escrow TEE instance with the secret, the device is air gapped at a second time immediately after provisioning the escrow TEE instance with the secret.

11. A method comprising:
    launching, by a processor, an escrow TEE instance provisioned with a secret, wherein the secret is initially accessible from a first location, and wherein accessibility to the secret in the first location is restricted after provisioning the escrow TEE instance with the secret;
    launching the application TEE instance;
    obtaining, during a launch of the application TEE instance, a cryptographic measurement associated with the application TEE instance;
    validating the application TEE instance;
    based upon a successful validation of the application TEE instance, providing the secret from a second location to the application TEE instance;
    upon the receipt of the secret by the application TEE instance, creating, by the application TEE instance, a clone TEE instance of the application TEE instance; and
    providing the secret to the clone TEE instance by the application TEE instance, wherein the clone TEE instance comprises a service to launch additional clone TEE instances, wherein the clone TEE instance is configured to provide the secret to the additional clone TEE instances.

12. The method of claim 11, wherein the cryptographic measurement identifies characteristics of the application TEE instance including at least one of a type of the TEE instance, a version of the TEE instance, and a description of software components loaded into the TEE instance.

13. The method of claim 12, wherein the cryptographic measurement further includes an integrity code to validate the cryptographic measurement.

14. The method of claim 11, wherein the application TEE instance is an encrypted virtual machine.

15. The method of claim 11, wherein the escrow TEE instance is an encrypted virtual machine, and wherein that escrow TEE instance is configured to serve application requests similar to the application TEE instance.

16. The method of claim 11, wherein the memory is hardware encrypted storage.

17. The method of claim 11, wherein restricting accessibility to the secret includes removing the secret from the memory.

18. The method of claim 11, wherein the secret is initially stored in memory that is part of a private network at a first time, wherein the escrow TEE instance is part of an outside network, and wherein restricting accessibility to the secret includes removing the secret from the memory at a second time immediately after provisioning the escrow TEE instance with the secret.

19. The method of claim 11, wherein the secret is initially stored in the first location on a device and the device is air gapped after provisioning the escrow TEE instance with the secret.

20. A non-transitory machine-readable medium storing code, which when executed by a processor is configured to:

launch an escrow TEE instance provisioned with a secret, wherein the secret is initially accessible from a first location, and wherein accessibility to the secret in the first location is restricted after provisioning the escrow TEE instance with the secret;

receive a request to start an application TEE instance;

obtain, during a launch of the application TEE instance, a cryptographic measurement associated with the application TEE instance;

validate, the application TEE instance;

upon a successful validation of the application TEE instance provide the secret from a second location to the application TEE instance, wherein the providing of the secret to the application TEE instance allows the application TEE instance to complete the launch;

create a clone TEE instance based on the application TEE instance; and provide the secret to the clone TEE instance by the application TEE instance, wherein the clone TEE instance includes a clone service to launch additional clone TEE instances and provide the secret to the additional clone TEE instances.

* * * * *